Sept. 1, 1959　　　　　R. ADELL　　　　　2,902,313
TRIM MOLDING FOR VEHICLE DOORS
Original Filed April 3, 1952　　　　　　　2 Sheets-Sheet 1
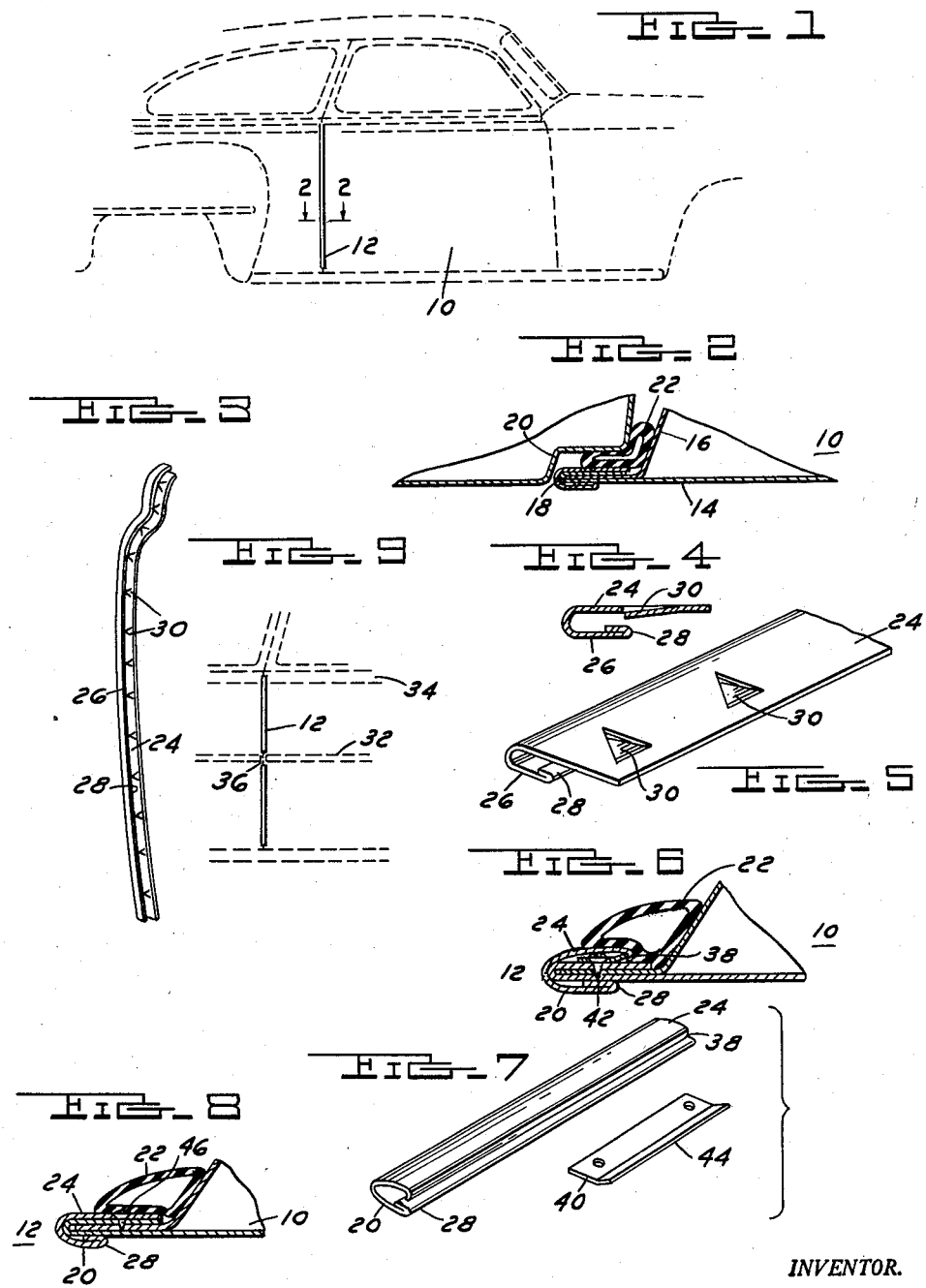
INVENTOR.
ROBERT ADELL
BY
Burton & Parker
ATTORNEYS Sept. 1, 1959 R. ADELL 2,902,313
TRIM MOLDING FOR VEHICLE DOORS
Original Filed April 3, 1952 2 Sheets-Sheet 2

INVENTOR.
ROBERT ADELL
BY
*Burton & Parker*
ATTORNEYS

United States Patent Office 2,902,313
Patented Sept. 1, 1959

2,902,313

TRIM MOLDING FOR VEHICLE DOORS

Robert Adell, Detroit, Mich., assignor to Franklin Z. Adell and Marvin M. Adell, Detroit, Mich.

Continuation of abandoned application Serial No. 280,297, April 3, 1952. This application May 23, 1958, Serial No. 738,911

2 Claims. (Cl. 296—44)

This invention relates to a decorative trim molding for automobile doors. The present invention is a continuation of my application Serial No. 280,297, filed on April 3, 1952, for Trim Molding, and now abandoned.

An object is to provide a molding which will not only serve a decorative purpose, but is of such character that it will protect the edge of an automobile door against the scuffing or roughing up which frequently occurs in service. The lock margin of an automobile door, and this applies particularly to the front door of a closed automobile body, frequently becomes scratched, chipped or dented due to the constant use of such door and such portion of an automobile body requires refinishing more often than any other. As a result, it is not uncommon to find automobile bodies which are in good shape as to finish except for the fact that the free margins of the front doors are scratched or marred in one way or another.

An object of this invention is to provide a protective finished strip which may be readily applied to the margin of an automobile door and will protect the same. It will conceal any marring or scratching which has occurred and it will prevent the subsequent occurrence of such defacing or injury to the surface of the door along the margin thereof.

Another object is the provision of a finish molding of the character set forth which molding may be sold as an accessory or attachment that can be applied by the owner to an automobile already in use. It does not require the services of a skilled mechanic to apply the same.

Another object is the provision of a molding of the kind herein described which adds a decorative appearance to the automobile body. The molding not only serves to conceal injury which the finish has suffered and to prevent further injury, but it improves the appearance of the body as a whole.

The improved molding of this application is simple and inexpensive and is effective for the purpose for which it is intended to be used.

Other objects, advantages and meritorious features of the invention will more fully appear from the following description, claims and accompanying drawings, wherein:

Fig. 1 is a schematic view of a conventional closed automobile body broken away but illustrating the front door provided with my improved molding.

Fig. 2 is a horizontal cross sectional view taken on the line 2—2 of Fig. 1.

Fig. 3 is a perspective of a strip of finish molding suitable for application to a margin of a conventional automobile door showing one embodiment of the invention.

Fig. 4 is a transverse sectional view taken through the molding shown in Fig. 3.

Fig. 5 is an enlarged perspective of a fragment of a molding shown in Fig. 3.

Fig. 6 is a transverse sectional view taken on the same line as that of Fig. 2, but showing my improved molding embodied in a form exhibiting a different type of securing means to that shown in Figs. 3, 4 and 5.

Fig. 7 is a perspective of a fragment of the molding shown in Fig. 6 and the securing means which is used with such molding.

Fig. 8 is a transverse sectional view taken on a line substantially similar to that of Figs. 2 and 6 and showing my molding secured to the margins of an automobile door with securing means different from that shown in Figs. 2 and 6.

Fig. 9 is a fragmentary schematic view showing the molding 12 secured to the margin of the door where there is a decorative band extending about the body below the belt line.

Figure 11:
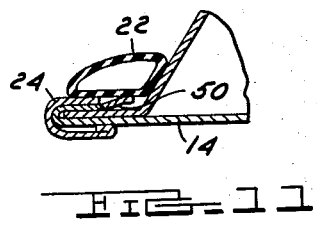
Fig. 11 is a cross sectional view taken on substantially the same line as Fig. 6 but showing the embodiment of the molding illustrated in Fig. 10.

The molding of this application is adapted for use in connection with the margin of a door of any conventional type of automobile body. A representative closed automobile body is shown in Fig. 1. In such figure a front door is indicated by the numeral 10. The free margin of such door is shown as provided with the molding of this invention, which molding is indicated generally at 12. Such molding is preferably formed of metal. It may be thin tempered stainless spring steel which has been chrome plated or otherwise suitable finished to present an attractive appearance and to be durable in use.

In Fig. 2 the automobile door 10 is shown as comprising an outer panel portion 14, the margin of which is folded as at 18 over an inner panel portion 16. The door pillar against which the free margin of the door abuts is indicated by the numeral 20. The jamb face of the door is shown as provided with a weather stripping gasket 22. This gasket may be in the form of a rubber strip adapted to serve as a bumper as well as to seal the joint between the edge of the door and the jamb against air drafts.

In normal practice the outer surface along the margin of the door becomes abraded or dented or scratched when in use. It is the portion of the door which receives the hardest treatment and that portion where the finish breaks away most rapidly. My protective finish molding is shown in Figs. 1, 2, 3 and 9 as a strip of suitable length and contour, channel-shaped in cross section, to embrace the margin of the door below the belt line of the body. This channel-shaped finish molding is illustrated in the first five figures of the drawings as having an inner wall 24 of greater width than the outer wall 26. The margin of the outer wall is shown as folded over upon itself within the channel as at 28.

To secure the molding upon the door margin the inner wall of the channel is punched out as at 30 providing lugs or teeth which project inwardly of the channel, as is best shown in Figs. 4 and 5. When the molding is shoved down over the margin of the door it rides over the inner face readily enough to permit placement of the molding. The teeth, however, dig into the inner surface of the door so as to prevent the molding being withdrawn. In practice this inner wall 24 of the channel molding is received underneath the gasket strip 22 and concealed thereby. The outer wall of the channel molding presents a finished appearance along its edge.

Fig. 9 illustrates a slight modification in that it shows an automobile body wherein there is a decorative molding 32 extending lengthwise of the body below the belt line 34 and this decorative molding necessitates a partial cutting away of my protective molding 12 hereinabove described, all as shown at 36 in Fig. 9.

Figs. 6 and 7 illustrate a slightly modified form of means for attaching the molding to the margin of the door. The door itself is indicated by the numeral 10 as hereinabove appears. It is provided with a rubber gasket 22 to form a tight seal between the free edge of the door and the jamb face of the body pillar. The molding 12 has an outer wall 26 rolled over as at 28, as hereinabove set forth. The inner wall 24 is shown as bent over along its inner margin as at 38.

There is provided a retaining strip or clip 40 which may be secured by screws or the like 42 to the inner margin of the automobile door spaced from the edge thereof. One margin of this retaining strip is bent outwardly as at 44. The inturned flange 38 of the inner wall 24 of the molding is adapted to hook over the outwardly flared margin 44 of the retaining strip. Such engagement is underneath the gasket 22. This engagement of the molding with the retaining strip holds the molding in place. The molding may be so formed that the wall 24 is spring tensioned to grippingly engage over the flared margin 44 when it is pushed thereover. This construction differs from the construction of Figs. 1 through 5 merely insofar as the means for securing the molding in place is concerned.

In Fig. 8 substantially the same molding is shown. The door is here indicated as 10 and the gasket strip as 22. The molding 12 has an outer wall 26 rolled over as at 28, as hereinabove described. The inner wall 24 is secured to the inner panel of the automobile door by screws 46 or the like. The screws are covered by the gasket strip 22.

Figure 10:
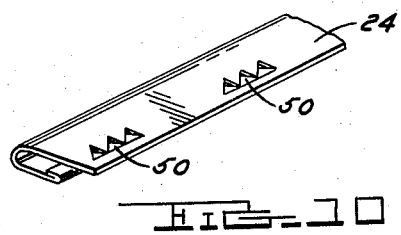
Fig. 10 shows a fragment of a molding embodying a slightly modified form as compared with the molding of the earlier figures of the drawing.

The molding shown in Figs. 10 and 11 is the same as that shown in Figs. 4 and 5 except that in Figs. 10 and 11 the molding is provided with detents or teeth 50 arranged in spaced apart groups. These teeth 50 are shown in Fig. 11 as engaged with the edge of the folded over margin of the outer panel 14. A gasket 22 overlies the inner wall 24 of the molding in the manner hereinabove described with respect to the structure of Fig. 2.

Figure 13:
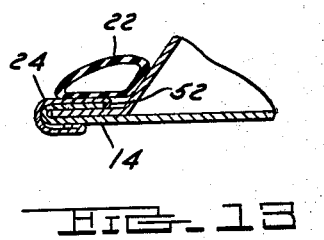
Fig. 13 is a cross sectional view taken substantially on the same line as Fig. 11 but illustrating the molding embodiment of Fig. 12.
Figure 12:
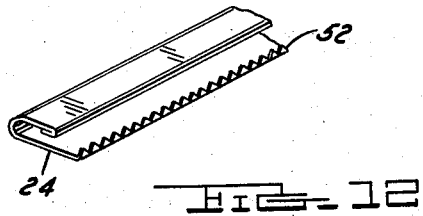
Fig. 12 illustrates in fragmentary perspective another embodiment of the invention.

The molding shown in Figs. 12 and 13 is similar to that shown in Fig. 6 except that the bent over margin of the inner wall 24 is serrated as illustrated at 52. This serrated flange 52 engages behind the edge of the turned over outer wall of the door panel as shown in Fig. 13.

Figure 15:
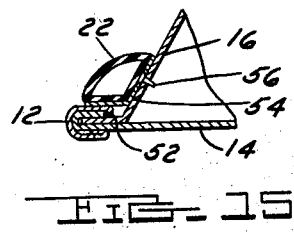
Fig. 15 is a cross sectional view taken on substantially the same line as Fig. 12 but illustrating the modification of Fig. 14.
Figure 14:
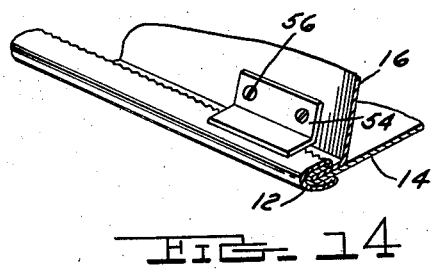
Fig. 14 illustrates in fragmentary perspective a modified form of an attachment for the molding in Fig. 12.

Figs. 14 and 15 illustrate the use of a retaining plate 54 fastened to the inner door panel 16 by screws 56 or the like. This plate serves to securely hold the molding 12 in place. It is undersood that the molding 12 shown in each of the views may be normally tensioned to maintain its position upon the margin of the door, but the plate 54 assures its retention in such position.

In Fig. 15 a gasket member 22 is shown as covering such plate 54. The screws 56 which may be self-tapping screws may extend entirely through the panel 16 as shown in Fig. 15 so as to form a secure attachment therewith.

In Figs. 6 and 8 the screws 42 and 46 cannot be extended entirely through the metal layers and such metal layers must therefore possess sufficient thickness to hold such screws if the retention is to be secure.

The several forms illustrated comprise separate modifications of the same inventive idea. One modification might be more suitable for one make and model of automobile, and another modification might be more suitable for another make and model of car.

I claim:

1. In an automobile body, a swinging door having one of its sides hinged to the body structure and including a peripheral trailing edge, an ornamental and edge protective molding made as a separate piece and connected to said body along at least a portion of the free side thereof to cover at least a portion of said trailing edge, said molding being made from a strip of resilient sheet metal bent longitudinally upon itself to a substantially U-shaped cross section to provide an inner leg, an outer leg, and a rounded connected portion, a hook flange provided along the free edge of the inner leg, a retaining clip secured to the trailing edge and having a flared-out portion directed away from the trailing edge, said molding engaging said flared-out portion with its hook flange for retaining itself in place on said trailing edge.

2. The construction defined in claim 1, said retaining clip being secured to the trailing edge on the inner side of the latter with the aid of screws.

References Cited in the file of this patent

UNITED STATES PATENTS

| | | |
|---|---|---|
| 1,800,060 | Farrington | Apr. 7, 1931 |
| 2,146,090 | O'Rourke | Feb. 7, 1939 |
| 2,226,615 | Killen | Dec. 31, 1940 |
| 2,356,976 | Conlon | Aug. 29, 1944 |
| 2,383,575 | Wernig | Aug. 28, 1945 |
| 2,464,406 | Kramer | Mar. 15, 1949 |